(12) United States Patent
Tittmann

(10) Patent No.: US 7,442,731 B2
(45) Date of Patent: Oct. 28, 2008

(54) OPAQUE, COLOUR-PIGMENTED COATING

(75) Inventor: Rolf Tittmann, Kandern (DE)

(73) Assignee: Ciba Specialty Chemicals Corp., Tarrytown, NY (US)

(*) Notice: Subject to any disclaimer, the term of this patent is extended or adjusted under 35 U.S.C. 154(b) by 578 days.

(21) Appl. No.: 10/529,408

(22) PCT Filed: Sep. 30, 2003

(86) PCT No.: PCT/EP03/10835

§ 371 (c)(1),
(2), (4) Date: Mar. 29, 2005

(87) PCT Pub. No.: WO2004/031280

PCT Pub. Date: Apr. 15, 2004

(65) Prior Publication Data

US 2006/0041037 A1    Feb. 23, 2006

(30) Foreign Application Priority Data

Oct. 7, 2002    (CH) .................................... 1668/02

(51) Int. Cl.
*C08K 5/34* (2006.01)
(52) U.S. Cl. .................... 524/88; 524/99; 428/457; 428/704
(58) Field of Classification Search ............ 524/88, 524/99; 428/457, 704
See application file for complete search history.

(56) References Cited

U.S. PATENT DOCUMENTS

| 4,415,685 | A | 11/1983 | Iqbal et al. ............. 524/92 |
| 5,200,528 | A | 4/1993 | Wooden et al. .......... 548/453 |
| 5,476,949 | A | 12/1995 | Wallquist et al. ........ 548/453 |
| 5,492,564 | A | 2/1996 | Wooden et al. .......... 106/493 |
| 5,618,343 | A | 4/1997 | Hendi et al. ............ 106/498 |
| 5,821,373 | A | 10/1998 | Hao et al. .............. 548/453 |
| 5,997,627 | A | 12/1999 | Bäbler ................. 106/493 |

FOREIGN PATENT DOCUMENTS

| EP | 0430875 | 6/1991 |
| EP | 0719842 | 7/1996 |
| EP | 0842989 | 5/1998 |

*Primary Examiner*—Kriellion A Sanders
(74) *Attorney, Agent, or Firm*—Joseph Suhadolnik

(57) ABSTRACT

The invention relates to a coating having a thickness of from 5 to 25 μm, comprising a high-molecular-weight organic material and from 5 to 9 g/m$^2$ colored pigments, wherein, based on the total amount of colored pigments, (a) from 30 to 90% by weight of 3,6-di(4'-biphenyl)-2,5-dihydro-pyrrolo[3,4-c]-pyrrole-1,4-dione having a specific surface area of from 20 to 50 m$^2$/g and (b) from 10 to 70% by weight of a further organic colored pigment, selected from the series consisting of quinacridone, diketo-pyrrolo[3,4-c]-pyrrole, dioxazine, indanthrone, perylene, phthalocyanine and 3-amino-1H-isoindol-1-one-oximatometal complex pigments and solid solutions and mixtures thereof, are present.

20 Claims, No Drawings

OPAQUE, COLOUR-PIGMENTED COATING

Coloured finishes, especially red finishes, for example in the automobile industry, are applied in layers having a dry film thickness of from 35 to 40 µm. Although thinner layers would in principle be desirable for economic reasons, this is not possible since thin layers having at the same time tinctorially strong, attractive coloristic properties, adequate covering power and good surface-coating characteristics cannot be successfully produced. If, for example, attempts are made to reduce the layer thickness while using the same amount of pigment per unit of area, these fail because of the rheology of the surface coating, which results in unsatisfactory gloss.

The object of the invention was to provide a coloured finish that can be used in thin layers and that satisfies high requirements. Surprisingly, this has successfully been achieved by the use of a combination of various pigments in a narrow, low concentration range.

U.S. Pat. No. 5,476,949 discloses finely dispersed diketopyrrolopyrrole pigments, among them 3,6-di(4'-biphenyl)-2,5-dihydro-pyrrolo[3,4-c]-pyrrole-1,4-dione having a colour saturation C* of 15.8 in 1% concentration in a 1 mm thick PVC injection moulding. The Stokes equivalent diameter $D_{84}$ is <0.21 µm, and the $D_{max}$ value is 0.11 µm. That pigment has outstanding transparency.

U.S. Pat. No. 5,492,564 discloses 3,6-di(4'-biphenyl)-2,5-dihydro-pyrrolo[3,4-c]-pyrrole-1,4-dione having a high covering power and an extraordinarily high colour saturation C* of $\geq 45$ in 1% concentration in a 1 mm thick PVC injection moulding produced according to DIN 53775/Part 2. According to Examples 4 and 5, that colour saturation is also obtained in an acrylic varnish comprising 16.4% by weight pigment. Other coloured pigments are not mentioned, however, and nor is the layer thickness.

State of the art in high-quality red finishes are those based on opaque Colour Index Pigment Red 254 (Irgazin® DPP Red BO or BOX, Ciba Spezialitätenchemie AG), in combination with high-transparency pigments such as, for example, Pigment Red 177 (Cromophtal® Red A2B, Ciba Spezialitätenchemie AG). The properties of such finishes leave something to be desired, however, when they are applied in layers having a dry film thickness of approximately 30 µm or less.

The invention relates to a coating having a thickness of from 5 to 25 µm, comprising a high-molecular-weight organic material and from 5 to 9 g/m² coloured pigments, wherein, based on the total amount of coloured pigments, (a) from 30 to 90% by weight of 3,6-di(4'-biphenyl)-2,5-dihydro-pyrrolo[3,4-c]-pyrrole-1,4-dione having a specific surface area of from 20 to 50 m²/g and (b) from 10 to 70% by weight of a further organic coloured pigment, selected from the series consisting of quinacridone, diketo-pyrrolo[3,4-c]-pyrrole, dioxazine, indanthrone, perylene, phthalocyanine and 3-amino-1H-isoindol-1-one-oximato-metal complex pigments and solid solutions and mixtures thereof, are present.

The coating preferably contains in total from 6 to 8 g/m² coloured pigments. It is also preferred for the thickness of the coating to be approximately from 15 to 25 µm.

3,6-Di(4'-biphenyl)-2,5-dihydro-pyrrolo[3,4-c]-pyrrole-1,4-dione, known as Pigment Red 264, preferably constitutes from 40 to 80% by weight of the coloured pigment mixture. The specific surface area thereof is preferably from 30 to 40 m²/g, and the amount thereof is especially from 5 to 15% by weight, most especially from 8 to 12% by weight, based on the total coating according to the invention.

All data refer to the dry, fully cured coating.

The further quinacridone, diketo-pyrrolo[3,4-c]-pyrrole, dioxazine, indanthrone, perylene, phthalocyanine and 3-amino-1H-isoindol-1-one-oximato-metal complex pigments (b) are, for example, Pigment Blue 15:1, Pigment Blue 15:2, Pigment Blue 15:3, Pigment Blue 15:4, Pigment Blue 15:6, Pigment Blue 16, Pigment Blue 60, Pigment Blue 64, Pigment Green 7, Pigment Green 36, Pigment Green 37, Pigment Red 122, Pigment Red 123, Pigment Red 149, Pigment Red 178, Pigment Red 179, Pigment Red 190, Pigment Red 202, Pigment Red 224, Pigment Red 254, Pigment Red 255, Pigment Red 257, Pigment Red 270, Pigment Red 272, Pigment Violet 19, Pigment Violet 23, Pigment Violet 29 or Pigment Violet 37, preferably quinacridone, diketo-pyrrolo[3,4-c]-pyrrole, dioxazine, indanthrone or perylene pigments, especially Pigment Violet 19, Pigment Red 202 or Pigment Red 254. These further organic coloured pigments are preferably those having a specific surface area of from 10 to 40 m²/g, in the case of quinacridone or diketo-pyrrolo[3,4-c]-pyrrole pigments especially from 10 to 25 m²/g and, in the case of dioxazine, indanthrone or perylene pigments, especially from 20 to 40 m²/g.

Component (b) of the coloured pigment may, where appropriate, consist of a mixture or a solid solution of several (for example from 2 to 5) coloured pigments (b). In the coloured pigment mixture, in addition to the two components (a) and (b), any desired further coloured pigments may also be present as additional components, preferably inorganic pigments, such as, for example, yellow or red iron oxides, molybdate orange or lead chromates, especially Pigment Red 101. If there are doubts as to whether a substance is a coloured pigment, a 35 µm thick film is produced on a roll mill from 0.5% by weight of that substance, 0.5% by weight of titanium oxide white (Pigment White 6) and 99% by weight of stabilised soft PVC, and the reflecting colour of the film is measured. Under d/8 geometry with the specular component included, $D_{65}$ light and a measuring angle of 10°, coloured pigments have a colour saturation C* of at least 5 in the CIE 1976 L*C*h* colour co-ordinate system.

It is also possible to use, in addition, other colour-influencing constituents, such as white pigments, black pigments or effect pigments. Those pigments must not, however, be included in the amount of the coloured pigment, even if they are used in the form of a mixture with a coloured pigment.

The high-molecular-weight organic material may be of natural or synthetic origin and usually has a molecular weight in the range from $10^3$ to $10^8$ g/mol. It may, for example, be a natural resin or a drying oil, rubber or casein, or a modified natural substance, such as chlorinated rubber, an oil-modified alkyd resin, viscose, a cellulose ether or ester, such as cellulose acetate, cellulose propionate, cellulose acetobuty-rate or nitrocellulose, but especially a totally synthetic organic polymer (a thermo-setting plastic or a thermoplastic), as is obtained by polymerisation, polycondensation or polyaddition, for example a polyolefin, such as polyethylene, polypropylene or polyisobutylene, a substituted polyolefin, such as a polymerisation product of vinyl chloride, vinyl acetate, styrene, acrylonitrile, an acrylic and/or methacrylic acid ester or butadiene, and also a copolymerisation product of the said monomers, especially ABS or EVA.

From the series of the polyaddition resins and polycondensation resins there may be mentioned condensation products of formaldehyde with phenols, so-called phenoplasts, and condensation products of formaldehyde with urea, thiourea or melamine, so-called aminoplasts, and the polyesters used as surface-coating resins, either saturated, such as alkyd resins, or unsaturated, such as maleate resins; also linear polyesters and polyamides or silicones.

The high-molecular-weight organic material may furthermore be a binder for surface coatings or printing inks, such as, for example, boiled linseed oil, nitrocellulose, an alkyd resin, a melamine resin, a urea/formaldehyde resin or an acrylic resin.

The said high-molecular-weight compounds may be present singly or in mixtures, in the form of plastic masses or melts. The person skilled in the art is advised to try out all the surface-coating compositions known to him, for example those which form the subject-matter of published Patent Applications or those which are commercially available, even if he does not know the precise composition thereof.

For pigmenting surface coatings, the high-molecular-weight organic materials and the pigments according to the invention, where appropriate together with additives such as stabilisers, dispersants, gloss-improvers, fillers, other pigments, siccatives or plasticisers, are generally finely dispersed or dissolved in an organic and/or aqueous solvent or solvent mixture, it being possible for the individual components to be dispersed or dissolved separately or for a number of components to be dispersed or dissolved together, and only thereafter for all the components to be brought together. The surface coatings are applied, for example, by immersion, doctor-coating, painting or spraying, producing, after drying and full curing, the coatings according to the invention.

Other methods of use that result in the coatings according to the invention are powder coating and coil coating methods, all details of which will be known per se to the person skilled in the art.

It is generally immaterial how the coating according to the invention is produced, provided that the features according to the invention are adhered to. The binders and coating method chosen depend, therefore, on the application and on the desired result. The person skilled in the art will, of course, be familiar with the advantages and disadvantages of each coating method but will nevertheless, as a matter of routine, try out all the procedures known to him, widely varying all the parameters within the known limits.

Multiple coatings are also possible, in which the coating according to the invention is only one of several coating layers. Multiple layers may be dried and/or fully cured individually or, in the so-called "wet-on-wet" process, may be allowed merely to begin to dry before application of the next layer. The coating according to the invention may be applied all at once or in several, sequential steps, only the thickness and the composition of the coating as a whole being important in this case. In such a case, the individual coloured pigment components (a) and (b) of the coating according to the invention may also be applied individually in succession so that they are present in adjacent layers. Usually, however, all the coloured pigment components will be pre-mixed at the latest during preparation of the surface coating and a mixture thereof will be applied.

The invention therefore relates also to a method of coating a material with a coating, in which method a surface-coating composition is used that comprises from 5 to 15% by weight of 3,6-di(4'-biphenyl)-2,5-dihydro-pyrrolo[3,4-c]-pyrrole-1,4-dione, based on the total non-volatile content (solids), wherein, based on the total amount of coloured pigments,
(a) from 30 to 90% by weight of 3,6-di(4'-biphenyl)-2,5-dihydro-pyrrolo[3,4-c]-pyrrole-1,4-dione having a specific surface area of from, 20 to 50 $m^2/g$ and
(b) from 10 to 70% by weight of a further organic coloured pigment, selected from the series consisting of quinacridone, diketo-pyrrolo[3,4-c]-pyrrole, dioxazine, indanthrone, perylene, phthalocyanine and 3-amino-1H-isoindol-1-one-oximato-metal complex pigments and solid solutions and mixtures thereof, are present.

Also novel, and therefore part of the invention, is a surface-coating composition comprising from 5 to 15% by weight of 3,6-di(4'-biphenyl)-2,5-dihydro-pyrrolo[3,4-c]-pyrrole-1,4-dione, based on the total non-volatile content, wherein, based on the total amount of coloured pigments,
(a) from 30 to 90% by weight of 3,6-di(4'-biphenyl)-2,5-dihydro-pyrrolo[3,4-c]-pyrrole-1,4-dione having a specific surface area of from 20 to 50 $m^2/g$ and
(b) from 10 to 70% by weight of a further organic coloured pigment, selected from the series consisting of quinacridone, diketo-pyrrolo[3,4-c]-pyrrole, dioxazine, indanthrone, perylene, phthalocyanine and 3-amino-1H-isoindol-1-one-oximato-metal complex pigments and solid solutions and mixtures thereof, are present.

The coating according to the invention is preferably applied to a substrate consisting of metal or plastics material, preferably to a plate, sheet, profiled element or moulding having a thickness of from 0.1 to 100 mm consisting of metal or plastics material, especially to an automobile body part. It is, of course, also possible for objects of substantial thickness to be provided with the coating according to the invention, for example stone or concrete elements, or thick hulls of ships, for example those of icebreakers.

The invention therefore relates also to a plate, sheet, profiled element or moulding having a thickness of from 0.1 to 100 mm consisting of metal or plastics material on which there is a coating according to the invention. Plastics materials are high-molecular-weight organic materials of synthetic origin, for example those of the kind listed hereinbefore.

The coating according to the invention is preferably provided, in addition, with a clear varnish in customary thickness as a protection, which comprises, for example, one or more UV-absorbers or which is also tinted with transparent coloured pigments or comprises effect pigments. When the coating according to the invention is on a metallic substrate, the latter will preferably be a primed substrate. In this connection it has surprisingly been found that the colour of the primer is unimportant. The colour result is so good on a white, black or grey primer that, in contrast to previous coatings, especially advantageously it is not necessary to apply a red primer. For practical reasons, therefore, a grey primer will usually be preferred.

The coatings according to the invention offer a surprisingly high colour strength together with good colour saturation. The covering power is excellent, despite a relatively low pigment concentration, the colour difference $\Delta E^*$ between a coating on white primer and a coating on black primer being preferably $\leq 2.5$, especially $\leq 1.5$. By varying the components and their concentration it is possible to obtain hues in a profusion of shades from mid-red through claret to violet. The light stability, weather stability and heat stability are excellent, as are the surface-coating properties such as, for example, high gloss.

The following Examples illustrate the invention without limiting the scope thereof (unless stated otherwise, "%" always denotes % by weight):

EXAMPLE 1

100 parts by weight of a formulation comprising 7.8 parts by weight of a coloured pigment mixture consisting of 3.4 parts by weight of Irgazin® DPP Red BOX (Pigment Red 254), 0.9 part by weight of Bayferrox® Red 105 M (Pigment Red 101) and 3.5 parts by weight of the pigment according to Example 1a) of U.S. Pat. No. 5,492,564 (Pigment Red 264), 45.4 parts by weight of Alkydal® F 310 (Bayer, 60% strength in Solventnaphtha™ 100), 4 parts by weight of Disperbyk® 161 (Byk Chemie, 30% strength in n-butyl acetate/1-methoxy-2-propyl acetate 1:6), 0.8 part by weight of silicone oil 1% in xylene, 3.3 parts by weight of 1-methoxy-2-propanol, 3.3 parts by weight of n-butanol, 15.4 parts by weight of xylene, 19.4 parts by weight of Maprenal, MF 650 (Solutia Inc., 30% strength in isobutanol/1-butanol/xylene 40:2:2 max.) and 0.6 part by weight of Tinuvin® 123 are dispersed using 230 parts by weight of glass beads in a dispersing machine for 2 hours at approximately 40° C. After removal of the glass beads, the coloured surface coating is sprayed in the intended layer thickness onto aluminium plates primed half in white and half in black, the respective application quantities per plate being approximately 10, 20, 30 and 40 g/m$^2$. The surface coatings are then left to evaporate for 30 minutes at approximately 25° C. and are then baked for 30 minutes at 130° C. The layer thicknesses are 5-6, 10-12, 15-18 and 20-25 μm, respectively, with a pigment to binder ratio (P:B) of 1:5.48. The hiding power, determined as the colour difference between white-primed and black-primed areas, is satisfactory to excellent depending on the layer thickness.

EXAMPLE 2

The procedure is analogous to Example 1 with a layer thickness of 20-25 μm, except that first a 10-12 μm thick layer comprising the total amount of Bayferrox® Red 105 M and 3,6-di(4'-biphenyl)-2,5-dihydro-pyrrolo[3,4-c]-pyrrole-1,4-dione pigment according to Example 1a) of U.S. Pat. No. 5,492,564 is sprayed and then a 10-12 μm layer comprising the total amount of Irgazin® DPP Red BOX. For the same thickness of coating the hiding power is comparable to that of Example 1. The surface of the surface coating is viewed from different viewing angles and at different angles of light incidence, thereby producing attractive effects.

The coloured pigment formulations of the following Comparison Examples are designed to produce as great as possible a correspondence of colour shade with that of Example 1 with the same total pigment content.

COMPARISON EXAMPLE 1

The procedure is the same as in Example 1, but with the use of 7.8 parts by weight of a coloured pigment mixture consisting of 1.5 parts by weight of Irgazin® DPP Ruby TR (Pigment Red 264), 5.2 parts by weight of Irgazin® DPP Red BOX, 1.0 part by weight of Bayferrox® Red 105 M and 0.1 part by weight of Kronos® titanium dioxide 2310 (Pigment White 6). The hiding power with the same thickness of the coating is in each case distinctly poorer than in Example 1.

COMPARISON EXAMPLE 2

The procedure is the same as in Example 1, but with the use of 7.8 parts by weight of a coloured pigment mixture consisting of 1.9 parts by weight of Cromophtal® Red A2B (Pigment Red 177), 4.9 parts by weight of lrgazin® DPP Red BOX, 0.9 part by weight of Bayferrox® Red 105 M and 0.1 part by weight of Kronos® titanium dioxide 2310. The hiding power with the same thickness of the coating is in each case distinctly poorer than in Example 1.

COMPARISON EXAMPLE 3

The procedure is the same as in Example 1, but with the use of 7.8 parts by weight of a coloured pigment mixture consisting of 1.8 parts by weight of Cinquasia® Magenta B RT-343 D (Pigment Red 202), 5.4 parts by weight of Irgazin® DPP Red BOX and 0.6 part by weight of Bayferroxe® Red 105 M. The hiding power with the same thickness of the coating is in each case distinctly poorer than in Example 1.

COMPARISON EXAMPLE 4

The procedure is the same as in Example 1, but with the use of 7.8 parts by weight of a coloured pigment mixture consisting of 2.1 parts by weight of Cinquasia® Magenta RT 355 D (quinacridone), 5.1 parts by weight of Irgazin® DPP Red BOX and 0.6 part by weight of Bayferrox® Red 105 M. The hiding power with the same thickness of the coating is in each case distinctly poorer than in Example 1.

The Examples given are illustrative of an alkyd/melamine surface-coating system. With the proper procedure, the same results will be obtained in any other surface-coating system customary today, to a great extent also irrespective of the solvent system.

What is claimed is:

1. An opaque coating having a thickness of from 5 to 25 μm, comprising a high-molecular-weight organic material, from 5 to 15% by weight of 3,6-di(4'-biphenyl)-2,5-dihydro-pyrrolo[3,4-c]-pyrrole-1,4-dione, based on the total non-volatile content, at least one further coloured pigment and optionally additionally white pigments, black pigments or effect pigments, wherein, based on the total amount of coloured pigments,
    (a) from 30 to 90% by weight of 3,6-di(4'-biphenyl)-2,5-dihydro-pyrrolo[3,4-c]-pyrrole-1,4-dione pigment having a specific surface area of from 20 to 50 m$^2$/g and
    (b) from 10 to 70% by weight of a further organic coloured pigment having a specific surface area of from 10 to 40 m$^2$/g, selected from the group consisting of quinacridones, diketo-pyrrolo[3,4-c]-pyrroles, perylenes, and 3-amino-1H-isoindol-1-one-oximato-metal complex pigments, and solid solutions and mixtures thereof, are present.

2. A coating according to claim 1, wherein component (b) is Pigment Red 122, Pigment Red 123, Pigment Red 149, Pigment Red 178, Pigment Red 179, Pigment Red 190, Pigment Red 202, Pigment Red 224, Pigment Red 254, Pigment Red 255, Pigment Red 257, Pigment Red 270, Pigment Red 272, Pigment Violet 19 or Pigment Violet 29.

3. A plate, sheet, profiled element or moulding having a thickness of from 0.1 to 100 mm consisting of metal or plastics material on which there is a coating according to claim 1.

4. A plate, sheet, profiled element or moulding according to claim 3, on which the coating is on a white, black or grey primer.

5. A plate, sheet, profiled element or moulding according to claim 3, provided with a clear varnish.

6. A method of coating a material with a coating, which method comprises the step of applying to the material a surface-coating composition comprising from 5 to 15% by weight of 3,6-di(4'-biphenyl)-2,5-dihydro-pyrrolo[3,4-c]-pyrrole-1,4-dione, based on the total non-volatile content, wherein, based on the total amount of coloured pigments,
    (a) from 30 to 90% by weight of 3,6-di(4'-biphenyl)-2,5-dihydro-pyrrolo[3,4-c]-pyrrole-1,4-dione pigment having a specific surface area of from 20 to 50 m$^2$/g and
    (b) from 10 to 70% by weight of a further organic coloured pigment having a specific surface area of from 10 to 40 m$^2$/g, selected from the group consisting of quinacridones, diketo-pyrrolo[3,4-c]-pyrroles, perylenes, and 3-amino-1H-isoindol-1-one-oximato-metal complex pigments, and solid solutions and mixtures thereof, are present.

7. A surface-coating composition comprising from 5 to 15% by weight of 3,6-di(4'-biphenyl)-2,5-dihydro-pyrrolo[3,4-c]-pyrrole-1,4-dione, based on the total non-volatile content, wherein, based on the total amount of coloured pigments,
   (a) from 30 to 90% by weight of 3,6-di(4'-biphenyl)-2,5-dihydro-pyrrolo[3,4-c]-pyrrole-1,4-dione pigment having a specific surface area of from 20 to 50 $m^2/g$ and
   (b) from 10 to 70% by weight of a further organic coloured pigment having a specific surface area of from 10 to 40 $m^2/g$, selected from the group consisting of quinacridones, diketo-pyrrolo[3,4-c]-pyrroles, perylenes and 3-amino-1H-isoindol-1-one-oximato-metal complex pigments, and solid solutions and mixtures thereof, are present.

8. A method according to claim 6, wherein the surface-coating composition is applied to the material by immersion, doctor-coating, painting or spraying.

9. A plate, sheet, profiled element or moulding having a thickness of from 0.1 to 100 mm consisting of metal or plastics material on which there is a coating according to claim 2.

10. A plate, sheet, profiled element or moulding according to claim 4, provided with a clear varnish.

11. A method according to claim 6, wherein the amount of 3,6-di(4'-biphenyl)-2,5-dihydro-pyrrolo[3,4-c]-pyrrole-1,4-dione having a specific surface area of from 20 to 50 $m^2/g$ is from 40 to 80% by weight of the total amount of coloured pigments.

12. A composition according to claim 7, wherein the amount of 3,6-di(4'-biphenyl)-2,5-dihydro-pyrrolo[3,4-c]-pyrrole-1,4-dione having a specific surface area of from 20 to 50 $m^2/g$ is from 40 to 80% by weight of the total amount of coloured pigments.

13. A method according to claim 6, wherein a quinacridone or diketo-pyrrolo[3,4-c]-pyrrole pigment each having a specific surface area of from 10 to 25 $m^2/g$ or a perylene pigment having a specific surface area of from 20 to 40 $m^2/g$ is used as component (b) of the surface-coating composition.

14. A composition according to claim 7, wherein a quinacridone or diketo-pyrrolo[3,4-c]-pyrrole pigment each having a specific surface area of from 10 to 25 $m^2/g$ or a perylene pigment having a specific surface area of from 20 to 40 $m^2/g$ is present as component (b).

15. An opaque coating according to claim 1 wherein (a) and (b) are present in adjacent layers.

16. An opaque coating according to claim 2 wherein (a) and (b) are present in adjacent layers.

17. A method according to claim 6, wherein (a) and (b) are applied individually so that they are present in adjacent layers.

18. An opaque coating according to claim 1, wherein, component (a) is from 40 to 80% by weight of 3,6-di(4'-biphenyl)-2,5-dihydro-pyrrolo[3,4-c]-pyrrole-1,4-dione pigment having a specific surface area of from 20 to 50 $m^2/g$ based on the total amount of coloured pigments.

19. An opaque coating according to claim 1, wherein, component (b) is a quinacridone or diketo-pyrrolo[3,4-c]-pyrrole pigment, each of which has a specific surface area of from 10 to 25 $m^2/g$ or a perylene pigment having a specific surface area of from 20 to 40 $m^2/g$.

20. An opaque coating according to claim 18, wherein (a) and (b) are present in adjacent layers.

* * * * *